US00RE48192E

(19) United States
(12) Reissued Patent
Maltby et al.

(10) Patent Number: US RE48,192 E
(45) Date of Reissued Patent: Sep. 1, 2020

(54) RECEPTACLE-MOUNTED COVER PLATE TO HIDE ELECTRICAL SOCKET FACE

(71) Applicant: Hubbell Incorporated, Shelton, CT (US)

(72) Inventors: Edgar W. Maltby, Mesa, AZ (US); Marcus J. Shotey, Scottsdale, AZ (US)

(73) Assignee: HUBBELL INCORPORATED, Shelton, CT (US)

(21) Appl. No.: 15/656,602

(22) Filed: Jul. 21, 2017

Related U.S. Patent Documents

Reissue of:
(64) Patent No.: 6,977,342
Issued: Dec. 20, 2005
Appl. No.: 10/966,546
Filed: Oct. 15, 2004

(51) Int. Cl.
*H02G 3/14* (2006.01)

(52) U.S. Cl.
CPC ..... *H02G 3/14* (2013.01)

(58) Field of Classification Search
CPC ..... H02G 3/14
See application file for complete search history.

(56) References Cited

U.S. PATENT DOCUMENTS 1,926,001 A 9/1933 Goodridge
2,526,606 A * 10/1950 Gregg ..... 174/67
2,934,591 A * 4/1960 Tiikkainen ..... 220/242
3,437,737 A 4/1969 Wagner
3,437,738 A 4/1969 Wagner
3,840,692 A 10/1974 Wells
3,928,716 A 12/1975 Marrero
4,584,430 A * 4/1986 Belknap ..... 174/67
4,774,641 A * 9/1988 Rice ..... 174/66
4,886,465 A * 12/1989 Warner ..... D8/350
4,952,755 A * 8/1990 Engel et al. ..... 174/67
4,970,349 A 11/1990 Jones
4,972,045 A 11/1990 Primeau
5,017,153 A 5/1991 Bowman
5,180,886 A 1/1993 Dierenbach et al.
5,342,995 A 8/1994 Comerci et al.
5,384,428 A * 1/1995 Luu ..... 174/66
5,835,980 A 11/1998 Houssian
5,856,633 A * 1/1999 Zelkovsky ..... 174/67
5,965,846 A * 10/1999 Shotey et al. ..... H02G 3/14 174/66
6,160,219 A 12/2000 Maltby et al.
6,361,361 B1 * 3/2002 Henry ..... H02G 3/14 174/67
6,511,343 B1 1/2003 Shotey et al.
6,761,582 B1 * 7/2004 Shotey et al. ..... 220/241

* cited by examiner

*Primary Examiner* — Leonardo Andujar
(74) *Attorney, Agent, or Firm* — Wissing Miller LLP

(57) ABSTRACT

An easily-installed cover plate for hiding the face of sockets by covering an electrical outlet, including the face of the sockets. The cover plate is mounted over the receptacle and has apertures for plug blades. In the preferred embodiment, the cover plate is rectangularly shaped to cover a duplex receptacle, having apertures to receive plug blades, a center hole for receiving a screw which secures the cover plate over the duplex receptacle and a thickness at the apertures for receiving plug blades of not more than 0.075 inches.

11 Claims, 3 Drawing Sheets

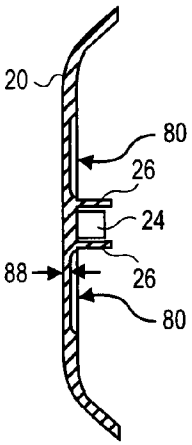
FIG. 11
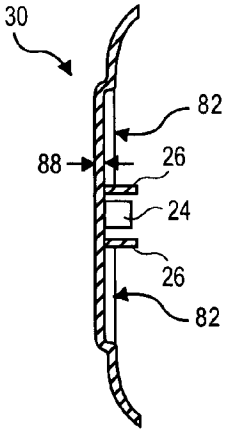
FIG. 12
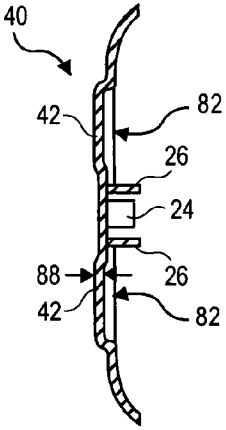
FIG. 13
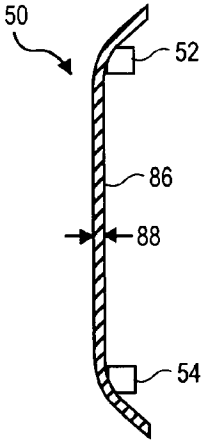
FIG. 14
FIG. 15
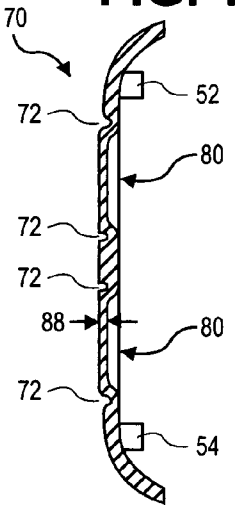
FIG. 16
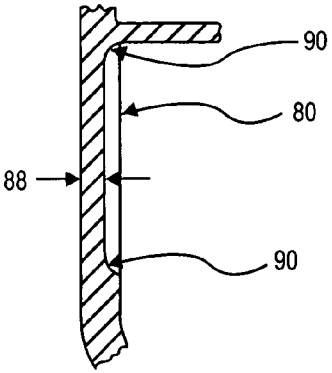
FIG. 17

RECEPTACLE-MOUNTED COVER PLATE TO HIDE ELECTRICAL SOCKET FACE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

[CROSS REFERENCE TO RELATED APPLICATIONS]

[This application is continuation-in-part of patent application by Shotey, et al. entitled "RECEPTACLE-MOUNTED COVER PLATE TO HIDE ELECTRICAL SOCKET FACE," Ser. No. 10/853,925, filed on May 25, 2004, which is a continuation of patent application by Shotey, et al. entitled "RECEPTACLE-MOUNTED COVER PLATE TO HIDE ELECTRICAL SOCKET FACE", Ser. No. 10/283,586, filed Oct. 29, 2002 and issued on Jul. 13, 2004 as U.S. Pat. No. 6,761,582, which is a continuation of patent application by Shotey et al. entitled "RECEPTACLE-MOUNTED COVER PLATE TO HIDE ELECTRICAL SOCKET FACE", Ser. No. 09/351,761, filed Jul. 12, 1999 and issued on Jan. 28, 2003 as U.S. Pat. No. 6,511,343, which is a continuation of patent application by Shotey, et al. entitled "RECEPTACLE-MOUNTED COVER PLATE TO HIDE ELECTRICAL SOCKET FACE," Ser. No. 08/775,382, filed Dec. 30, 1996 and issued on Oct. 12, 1999 as U.S. Pat. No. 5,965,846, the disclosures of which are hereby incorporated herein by reference.]

BACKGROUND OF THE INVENTION

1. Technical Field

This invention relates generally to cover plates for electrical outlets and more particularly to a simplified means to cover the face of unattractive electrical sockets and thereby make the outlet more aesthetically pleasing while maintaining proper functionality.

2. Background Art

Conventional electrical outlets are made of several components, including a wall box and a receptacle, which is typically composed of pairs of sockets and a yoke. The receptacle is typically attached to the wall box that is typically attached to a framing member inside the wall, and is accessible through a hole cut in the wall. A cover plate having apertures to allow the sockets to protrude is installed over these components, typically with one or two screws. Electrical devices are plugged in by inserting the plug blades through aligned apertures in the cover plate and socket.

A cover plate is installed after construction. It is common practice to remove the cover plate during remodeling or redecorating so that it does not become damaged or defaced with paint drips and splatters, wallpaper paste, or other decorating materials. The conventional cover plate is easily removed by unscrewing the screw or screws that attach it directly to the receptacle. However, the receptacle is not usually removed during remodeling or redecorating because it is hard-wired into the building's electrical system. Consequently, the receptacle and sockets are left exposed and the face of the sockets become covered with paint splatters and the like. If not cleaned immediately, the face becomes permanently defaced, thereby making the electrical outlet more unsightly and conspicuous. Repeated paintings only make the problem worse. Reinstalling the cover plate then emphasize the paint-splattered surface of the outlet, as the defaced socket surface is compared to the pristine surface of the cover plate.

Cover plates are available in a variety of colors, decorator textures and even covered with wallpaper to match the wall. However, the underlying receptacles and cover plates are made in standard colors, usually beige and dark brown, and unfortunately do not match many decorative cover plates. Because most cover plates allow the face of the sockets to be exposed, such mismatched sockets and cover plates cause the outlets to be more conspicuous. It is desirable, then, to provide a cover plate that can be installed over existing receptacles that covers not only the wall box assembly, but the face of the sockets, too, in order to make the outlet less conspicuous and more attractive.

Decorative cover plates known in the art attempt to make outlets more attractive by attaching a new cover plate to existing cover plates. For example, in U.S. Pat. No. 1,784,277 Darlington describes an ornamental cover for a light switch manufacturable in many colors. The cover is a multilayer pad of adhesively-backed sheets which is adhesively attached to the existing cover plate. When desired, a decorative sheet may be removed, exposing a new sheet. In U.S. Pat. No. 4,312,458, Stewart describes a fabric slipcover for an existing cover plate. In U.S. Pat. No. 3,840,692 Wells describes an outsized cover plate that is screwed over an existing cover plate. Because these decorative cover plates overlay the existing cover plate, these inventions result in a cover that projects farther from the wall than the original cover plate, thereby making the outlet even more noticeable.

More complex devices have been invented to achieve an aesthetically pleasing electrical outlet. For example, U.S. Pat. No. 5,180,886 issued to Dierenbach describes an entire wall box assembly to provide an attractive designer-style appearance. The decorative appearance is achieved with the use of a multi-component cover plate requiring a plurality of attachment means to secure the components in place.

The prior art also describes removable paint shields to protect the sockets and cover plates during painting. In U.S. Pat. No. 5,003,128 Grondin describes a cover that removably adheres to an existing cover plate of an electrical outlet so that the electrical elements are protected during painting. The device completely covers the receptacles such that a plug may not be inserted. Gilchrist describes a paint shield in U.S. Pat. No. 5,285,014 that also covers all exposed surfaces of an electrical outlet. The shield is temporarily attached using suction of adhesives, or with prongs that fit snugly in the socket apertures. While these devices do protect the outlets if installed before painting, they do not remedy the situation where the sockets are already defaced. Similarly, these covers do not provide a means for making the outlets more attractive.

Other patents describe inventions that replace existing cover plates to improve safety of the outlet. In U.S. Pat. No. 5,165,042 Klinger describes a decorative safety cover plate that replaces the existing plate. This invention comprises a base plate and a decorative face plate that slides between a closed position where the sockets are occluded, and an open position where the sockets are exposed. Barla describes a safety cover plate in U.S. Pat. No. 5,240,426 that replaces the existing cover plate. The plate has manually positionable shutters to occlude the entire socket so that plugs may not be inserted. While improving safety, these devices are multi-component parts that are relatively expensive, more difficult to install than a conventional cover plate, and prone to breaking. They also suffer the same problem as the known decorative cover plates: they project farther from the wall than the original cover plate, thereby making the outlet even more noticeable.

In U.S. Pat. No. 5,965,846 to Shotey et al., from which this patent is a continuation-in-part, a cover plate is disclosed having a thickness of 0.080 inches or greater. Cover plates according to this invention with thicknesses of 0.080 inches or greater have been sold. However, it does not teach the use of a cover plate with a thickness less than 0.080 inches.

Accordingly what is needed is a cover plate to cover the socket face of unattractive electrical receptacles and thereby make the receptacle less noticeable while maintaining proper functionality of electrical devices plugged into the covered socket.

BRIEF SUMMARY OF THE INVENTION

This invention provides a simple, easily-installed cover plate that hides the face of sockets by covering an electrical outlet, including the face of the sockets. In particular embodiments, the cover plate may comprise a plurality of plug blade apertures, a front surface, one or more thinned regions on the front surface, and a back surface region that contacts the socket face.

The back surface region may be substantially flat to seat against the insulative socket face. In particular embodiments, the cover plate also comprises an alignment structure to align the plurality of plug blade apertures on the cover plate with the plug blade apertures on the socket face. The alignment is particularly useful in obtaining proper seating of the back surface region against the insulative socket face.

In other embodiments of the present invention, the thinned areas may be of various shapes, including, but not limited to a duplex shape and a decora shape and may be formed using protrusions from the front surface or grooves in the front surface.

The foregoing and other features and advantages of the present invention will be apparent from the following more detailed description of the particular embodiments of the invention, as illustrated in the accompanying drawings.

BRIEF DESCRIPTION OF THE DRAWINGS

FIG. 11 is a section view of a cover plate taken along line 11-11 of FIG. 1;

FIG. 12 is a section view of a decora cover plate taken along line 12-12 of FIG. 2;

FIG. 13 is a section view of a duplex cover plate taken along line 13-13 of FIG. 3;

FIG. 14 is a section view of a cover plate with two securing apertures taken along line 14-14 of FIG. 4;

FIG. 15 is a section view of a decora cover plate with two securing apertures taken along line 15-15 of FIG. 5;

FIG. 16 is a section view of a duplex cover plate with two securing apertures taken along line 16-16 of FIG. 6; and FIG. 17 is a section view of a cover plate taken along line 17-17 of FIG. 1.

DESCRIPTION OF THE SEVERAL EMBODIMENTS

Figure 1:
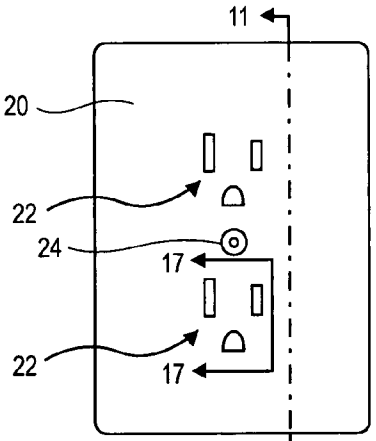
FIG. 1 is a front view of a cover plate with one securing aperture.
Figure 2:
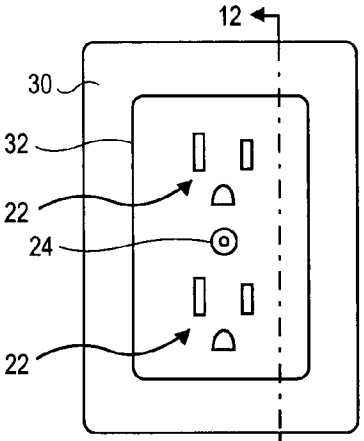
FIG. 2 is a front view of a decora cover plate with one securing aperture.
Figure 3:
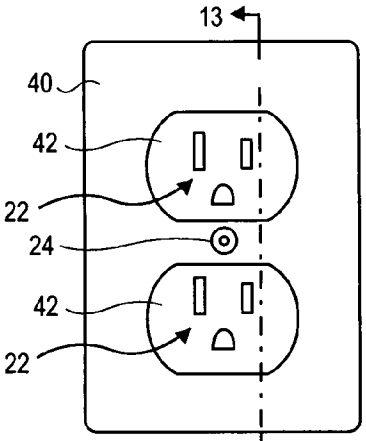
FIG. 3 is a front view of a duplex cover plate with one securing aperture.
Figure 4:
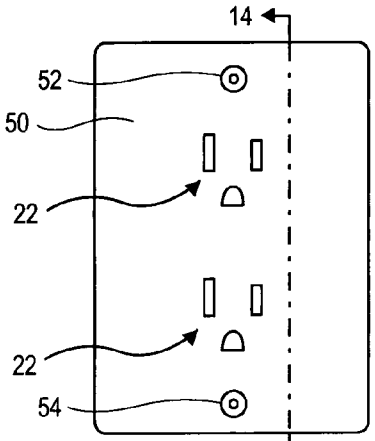
FIG. 4 is a front view of a cover plate with two securing apertures.
Figure 5:
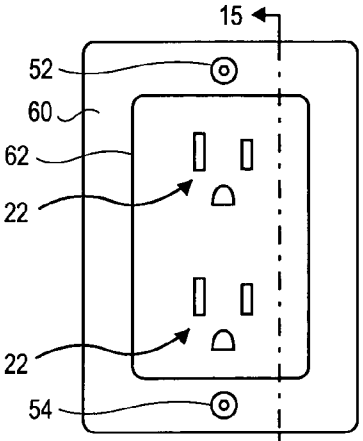
FIG. 5 is a front view of a decora cover plate with two securing apertures.
Figure 6:
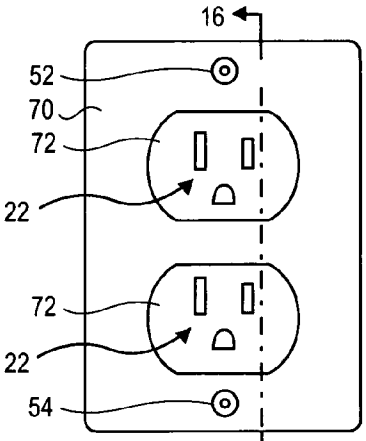
FIG. 6 is a front view of a duplex cover plate with two securing apertures.

Referring to FIGS. 1-6, embodiments of the invention are illustrated. FIG. 1 shows cover plate 20 having a flat face with a set of apertures 22 for plug blades and a securing aperture 24. FIG. 2 shows cover plate 30 having a decora face 32 with a set of apertures 22 for plug blades and a securing aperture 24. FIG. 3 shows cover plate 40 having a face with a duplex shape 42 with a set of apertures 22 for plug blades and a securing aperture 24. FIG. 4 shows cover plate 50 having a flat face with a set of apertures 22 for plug blades and top and bottom securing apertures 52 and 54. FIG. 5 shows cover plate 60 having a face with a decora groove 62 with a set of apertures 22 for plug blades and top and bottom securing apertures 52 and 54. FIG. 6 shows cover plate 70 having a face with duplex shaped grooves 72 with a set of apertures 22 for plug blades and top and bottom securing apertures 52 and 54. It will be understood by those of ordinary skill in the art that a duplex face or duplex socket face are those typically used wherein there are two sets of plug blade apertures located on two truncated circle shaped insulative socket faces. Also, the securing apertures may be adaptable such that each of the cover plates, 20, 30, 40, 50, 60, and 70 may have one or two securing apertures depending on the type of electrical outlet to be covered. The shape placed on the front surface of the cover plate, either by using grooves or protrusions, aids in the visual quality of the cover plate.

Figure 9:
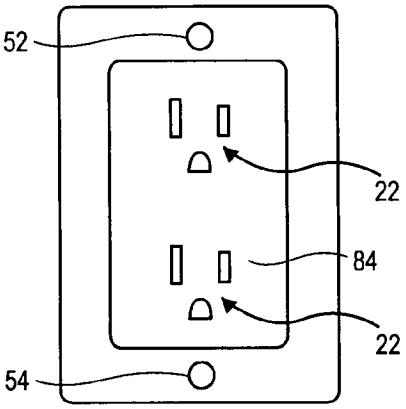
FIG. 9 is a back view of a cover plate with one rectangular recess and two securing apertures.
Figure 8:
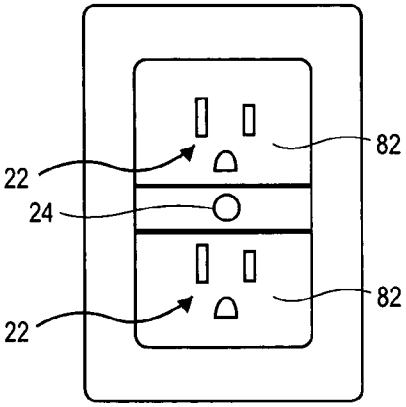
FIG. 8 is a back view of a cover plate with two rectangular recesses and one securing aperture.
Figure 7:
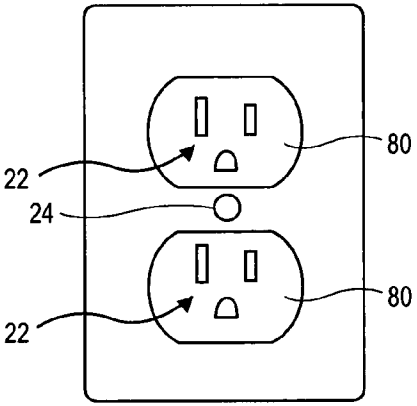
FIG. 7 is a back view of a cover plate with two truncated circle recesses and one securing aperture.
Figure 10:
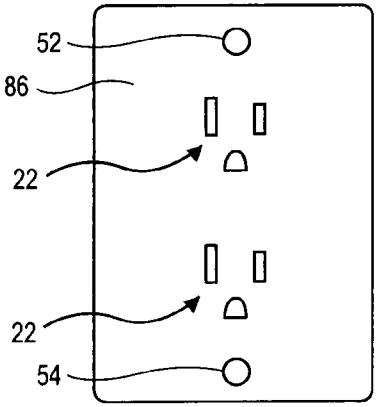
FIG. 10 is a back view of a cover plate with two securing apertures.

In embodiments of the present invention, the cover plate is specifically designed to cover the socket faces of the receptacle so there are no socket face apertures in the cover plate. For example and referring to FIGS. 7-10, the cover plate is adapted to receive the face of the socket against the reverse side or the back of the cover plate. In FIG. 7, a set of truncated circle shaped recesses 80 may receive a duplex socket face, while maintaining proper alignment of the apertures 22 for plug blades and the securing aperture 24. FIG. 8 shows the use of rectangular recesses 82 for receiving the socket face and aligning apertures 22 for plug blades and securing aperture 24. FIG. 9 uses a rectangular shaped recess 84 for receiving decora shaped socket faces and creating proper alignment of the apertures 22 for plug blades and securing apertures 52 and 54. Finally, as seen in FIG. 10 a flat surface back 86 may be used to cover any type of socket with alignment of the apertures 22 obtained by use of securing apertures 52 and 54. The various front cover types 20, 30, 40, 50, 60 and 70, as seen in FIGS. 1-6, may be used in conjunction with each type of reverse side configuration as shown in FIGS. 7-10 in order to obtain the look for the type of front surface desired while maintaining the ability to fit the socket face being covered. It will be understood that the specific embodiments illustrated in the figures are for exemplary purposes only and the present invention may be formed to have many various shapes, looks and textures on the front surface while altering the reverse side to fit any type of outlet socket face.

While the shape of the recessed, thinned areas need not coincide with the shape of the socket, the recessed, thinned areas can be manufactured to match the shape of the socket face. The cover plate is stronger and more durable with smaller thinned areas, however. With the more durable embodiment of the cover plate, the cover plate can also protect the receptacle from damage due to rough handling. For example, if a plug inserted into an outlet with a conventional cover plate is yanked out of the wall sideways, that is, substantially parallel to the wall, the forces applied to the sockets can cause the receptacle to be jarred loose or to crack. A cover plate of the present invention can help protect the receptacle because as the plug is pulled sideways from an outlet having the present cover plate, the applied forces in part act on the cover plate, reducing or eliminating the forces on the receptacle. Additionally, as areas of the cover plate are thinned, there is a visible slight variation in the cover plate at the thinned areas. Separating the thinned area by use of grooves or protrusions separates the visible distinction of the thinned area from the rest of the cover plate, rendering the differentiation more inconspicuous.

Referring now to FIGS. 11-16, section views of the preferred embodiment cover plates 20, 30, 40, 50, 60 and 70 respectively are shown. In FIG. 11, the cover plate 20 has a flat face and a back with truncated circle shaped recesses 80 and a securing aperture 24 to match the shape of a conventional duplex socket face. Flanges 26 surround the securing aperture 24 and are used for alignment of the apertures for plug blades located through the truncated circle shaped recesses 80. FIG. 12 shows a cover plate 30 with a decora protrusion face 32 and rectangular recesses 82 on the back of the cover plate 30. Flanges 26 surround the securing aperture 24 and are used for alignment of the apertures for plug blades located through the rectangular recesses 82. Looking at FIG. 13, a cover plate 40 with a duplex face 42 has square recesses 82 on the back of the cover plate 40. Flanges 26 surround the securing aperture 24 and are used for alignment of the apertures for plug blades located through the square recesses 82. In FIG. 14, the cover plate 50 with a flat face has a flat surface back 86. The securing apertures 52 and 54 are used for alignment of the apertures for plug blades located through the cover plate 50. FIG. 15 shows a cover plate 60 with a decora groove 62 of the face and decora recesses 84 on the back of the cover plate 60. The securing apertures 52 and 54 are used for alignment of the apertures for plug blades located through the cover plate 60. Looking at FIG. 16, a cover plate 70 with duplex grooves 72 on the face has a set of truncated circle shaped recesses 80 on the back of the cover plate 70. The securing apertures 52 and 54 are used for alignment of the apertures for plug blades located through the cover plate 50. It will be understood that any combination of faces, reverse sides (with the various recesses or a flat surface) and securing apertures may be utilized to form a cover plate with the desired design and proper functionality.

Also shown in FIGS. 11-16 is a thickness 88. For the exemplary purposes of this disclosure, the thickness 88 of the cover plates in the portions covering the socket faces are not more than 0.075 inches. The thickness 88 is located at the apertures 22 for the plug blades as seen in FIGS. 1-10. The thickness 88 may be of various shapes and sizes, so long as the thickness 88 does not exceed a maximum thickness of 0.075 inches. This area is the area through which plug blades are inserted and provides the point of electrical contact for a corded plug in the receptacle. This small thickness allows the plug blades to be inserted deeper into the plug blade apertures of the receptacle despite the insulative plug cover layer extending over the socket face. Additionally, a plane defined in part by one or more regions of the front surface with thickness 88, whereby the plane extends parallel to the cover plate, may serve as a boundary through which no portion of the front surface of the cover plate may extend beyond.

Exemplary embodiments of the present invention have the thickness 88 within the range of not more than 0.075 inches. It has been found that the conventional thickness of 0.080 inches and larger causes concern among some that sufficient contact will not be made by the plug prongs into the socket. Reduction of the thickness 88 to less than 0.075 inches, and more particularly to a range of 0.020-0.075 inches, permits the plug prongs to extend more fully into the socket, relieving many of those concerns. In particular embodiments of the present invention, a thickness of 0.020 inches may be achieved by use of particular materials, such as, but not limited to, polypropylene and polyethylene. In other particular embodiments, the thickness of 0.020 inches may also be accomplished by use of a vacuum used during the material flow process. As the vacuum evacuates the air within a mold used to form a cover plate, the material forming the cover plate may more easily be drawn into all cavities of the mold. To maximize the strength of the covering surface while minimizing the thickness 88, it has been found that a thickness between 0.030 inches and 0.055 inches reduces the likelihood of structural failure while maintaining the ability to achieve sufficient contact of the plug prongs within the socket. To maximize the contact made by the plug prongs into the socket, it has been found that a thickness within the range of 0.035-0.045 inches provides a substantially maximum contact between the plug prongs and the socket for a covered socket face while providing adequate strength of the covering surface. It will be understood by those of ordinary skill in the art that the ranges of thickness disclosed are for the exemplary purposes of this disclosure and that the present invention is not limited to these ranges.

In particular embodiments of the present invention, the thickness 88 may be accomplished by recessing or reducing the thickness from the back surface of the cover plate. This enables the front surface of the cover plate to not extend beyond the plane defined in part by the one or more thinned regions of the front surface that extends parallel to the cover plate. This vertical plane sets the boundary for which portions of the cover plate should not extend past, allowing for unobstructed insertion of plug blades into the receptacle through the cover plate. While portions of the front face may not extend beyond the vertical plane, they may extend backward. For example, a protrusion may extend from the back surface of the cover plate at the plug blade apertures corresponding to particular recesses on the socket face. This protrusion thereby provides proper alignment of the apertures, allowing the back surface of the cover plate to seat properly against the socket face, while maintaining the vertical plane boundary at the thinned front surface regions of the cover plate. Protrusions extending from the back surface may be used so long as the thickness 88 remains less than 0.075 inches from the front surface of the cover plate to the foremost portion of the socket face seated against the back surface of the cover plate at the plug blade apertures of the cover plate.

Referring to FIG. 17, a section view of the truncated circle shaped recess 80 is shown with thickness 88. In particular embodiments of the present invention radii 90 may used instead of a right angles to achieve a small thickness 88 and still maintain the structural and aesthetic integrity of the cover plate. Conventional recesses are formed using right angle edges, which is harder to manufacture due to insufficient material flow. Additionally, recessed or thinned areas with thicknesses less than 0.075 inches formed using right angle recesses often form a wavy or inconsistent surface affecting the aesthetics and structure of the cover plate. The use of radii 90 at the corners in particular embodiments of the present invention improves material flow and enables the cover plate to have improved structural and aesthetics integrity by substantially reducing or eliminating wavy surfaces. The greater the radius of curvature, the better the material flow, but at some point the radius wall will interfere with the socket face. Those of ordinary skill in the art will readily be able to select a radius of curvature appropriate for matching a back surface of a cover plate with a particular socket face to optimize material flow without significantly impeding the socket face from resting against the back surface of the cover plate.

Cover plates of the present invention may be installed in various manners. Conventional outlets have a threaded receiving aperture centered between the sockets for receiving a screw while other outlets have a pair of receiving apertures placed at opposite ends of the receptacle in the yoke. The present invention may be made to accommodate any underlying receptacle. If necessary to strengthen the cover plate's securing aperture, a protrusion such as the flange 26, shown surrounding the securing aperture 24 in FIG. 11, may project outwardly from the reverse side of the cover plate.

The number of apertures in the cover plate for receiving plug blades is dependent on the number of blades on the plug. Typically, the number and position of apertures on the cover plate will match the number and position of apertures on the receptacles, although fewer apertures may be used on the cover plate to exclude particular apertures in the socket faces, if desired. Conventional dual receptacle outlets have two sets of apertures, one set for each socket face. In addition to outlets having different numbers of apertures, outlets may have varying numbers of socket faces. For example, conventional outlets have two socket faces and are known as single-gang outlets. Double-gang outlets are also common. The cover plate of the present invention can be made with corresponding number and placement of apertures to match and align with the number of underlying socket faces. Alternatively, cover plates comprising selected aspects of the present invention may be manufactured to include one or more openings for switches or other electrical devices, without limitation, in addition to including one or more thinned front surface regions for hiding socket faces.

The cover plates of the present invention typically have outside dimensions that substantially match a conventional or existing cover plate, but the cover plates herein described may be designed in any desired size and shape to enhance the appearance of the electrical outlet.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

What is claimed is:

[1. A cover plate for an electrical outlet having at least one socket with an insulative socket face having plug blade apertures therethrough, the cover plate comprising:

a one-piece cover plate having at least one front surface configured to cover at least one insulative socket face of an electrical outlet, and a back surface region which contacts the at least one socket face when the cover plate is installed on the electrical outlet;

a plurality of plug blade apertures and at least one securing aperture extending from at least one front surface region to the back surface region of the cover plate;

the at least one front surface region having a thickness between the front surface and the back surface region of not more than about 0.075 inches;

wherein the at least one front surface region at least partially defines a plane substantially parallel with the cover plate through which the cover plate cannot extend beyond.]

[2. The cover plate of claim 1, wherein the thickness is between about 0.020 inches and about 0.075 inches.]

3. [The cover plate of claim 1, wherein the thickness is between about 0.030 inches and about 0.055 inches] *A cover plate for an electrical outlet having at least one socket with an insulative socket face having plug blade apertures therethrough, the cover plate comprising: a one-piece cover plate having at least one front surface configured to cover at least one insulative socket face of an electrical outlet, and a back surface region which contacts the at least one socket face when the cover plate is installed on the electrical outlet a plurality of plug blade apertures and at least one securing aperture extending from at least one front surface region to the back surface region of the cover plate; the at least one front surface region having a thickness between the front surface and the back surface region of between about 0.030 inches and about 0.055 inches; wherein the at least one front surface region at least partially defines a plane substantially parallel with the cover plate through which the cover plate cannot extend beyond.*

4. The cover plate of claim [1] *3*, wherein the thickness is between about 0.035 inches and about 0.045 inches.

5. The cover plate of claim [1] *3*, wherein the back surface region is substantially flat to seat against the at least one insulative socket face.

6. The cover plate of claim [1] *3*, further comprising at least one alignment structure configured to align the plurality of plug blade apertures of the cover plate with the plug blade apertures of the at least one insulative socket face.

[7. A cover plate for an electrical outlet having at least one socket with an insulative socket face having plug blade apertures therethrough, the cover plate comprising:

a one-piece cover plate configured to cover at least one socket face, having a back surface region that contacts the at least one socket face when the cover plate is installed on the electrical outlet, and a front surface, wherein the back surface region is substantially flat to seat against the at least one insulative socket face when the cover plate is installed;

a plurality of plug blade apertures and at least one securing aperture extending through the one-piece plate; and a front surface region having a thickness between the front surface and the back surface region of not more than 0.075 inches.]

[8. The cover plate of claim 7, wherein the thickness is between about 0.020 inches and about 0.075 inches.]

9. [The cover plate of claim 7, wherein the thickness is between about 0.030 inches and about 0.055 inches] *A cover plate for an electrical outlet having at least one socket with an insulative socket face having plug blade apertures therethrough, the cover plate comprising: a one-piece cover plate configured to cover at least one socket face, having a back surface region that contacts the at least one socket face when the cover plate is installed on the electrical outlet, and a front surface, wherein the back surface region is substantially flat to seat against the at least one insulative socket face when the cover plate is installed; a plurality of plug blade apertures and at least one securing aperture extending through the one-piece plate; and a front surface region having a thickness between the front surface and the back surface region of between about 0.030 inches and about 0.055 inches.*

10. The cover plate of claim [7] *9*, wherein the thickness is between about 0.035 inches and about 0.045 inches.

11. The cover plate of claim [7] *9*, further comprising a plane through which the front surface cannot extend beyond, the plane defined in part by the front surface region and extending substantially parallel to the cover plate.

12. The cover plate of claim [7] *9*, further comprising at least one alignment structure configured to align the plurality of plug blade apertures of the cover plate with the plug blade apertures of the at least one insulative socket face.

[13. A cover plate for an electrical outlet having at least one socket with an insulative socket face having plug blade apertures therethrough, the cover plate comprising:

a one-piece cover plate configured to cover at least one insulative socket face, the one piece plate having a front surface and a back surface region, wherein the back surface region is substantially flat to seat against the at least one insulative socket face;

a plurality of plug blade apertures and at least one securing aperture extending from a front surface region to the back surface region of the cover plate, the cover plate having a thickness between the front surface region and the back surface region at the plurality of plug blade apertures of not more than 0.075 inches; and a plane defined in part by the front surface region and extending substantially parallel to the cover plate through which the front surface cannot extend beyond.]

[14. The cover plate of claim 13, wherein the thickness is between about 0.020 inches and about 0.075 inches.]

15. [The cover plate of claim 13, wherein the thickness is between about 0.030 inches and about 0.055 inches] *A cover plate for an electrical outlet having at least one socket with an insulative socket face having plug blade apertures therethrough, the cover plate comprising: a one-piece cover plate configured to cover at least one insulative socket face, the one piece plate having a front surface and a back surface region, wherein the back surface region is substantially flat to seat against the at least one insulative socket face; a plurality of plug blade apertures and at least one securing aperture extending from a front surface region to the back surface region of the cover plate, the cover plate having a thickness between the front surface region and the back surface region at the plurality of plug blade apertures of between about 0.030 inches and about 0.055 inches; and a plane defined in part by the front surface region and extending substantially parallel to the cover plate through which the front surface cannot extend beyond.*

16. The cover plate of claim [13] *15*, wherein the thickness is between about 0.035 inches and about 0.045 inches.

17. The cover plate of claim [13] *15*, further comprising at least one alignment structure configured to align the plurality of plug blade apertures of the cover plate with the plug blade apertures of the at least one insulative socket face.

* * * * *